W. H. Bennett,
Making Barrel Heads.
N° 50,677.  Patented Oct. 31, 1865.
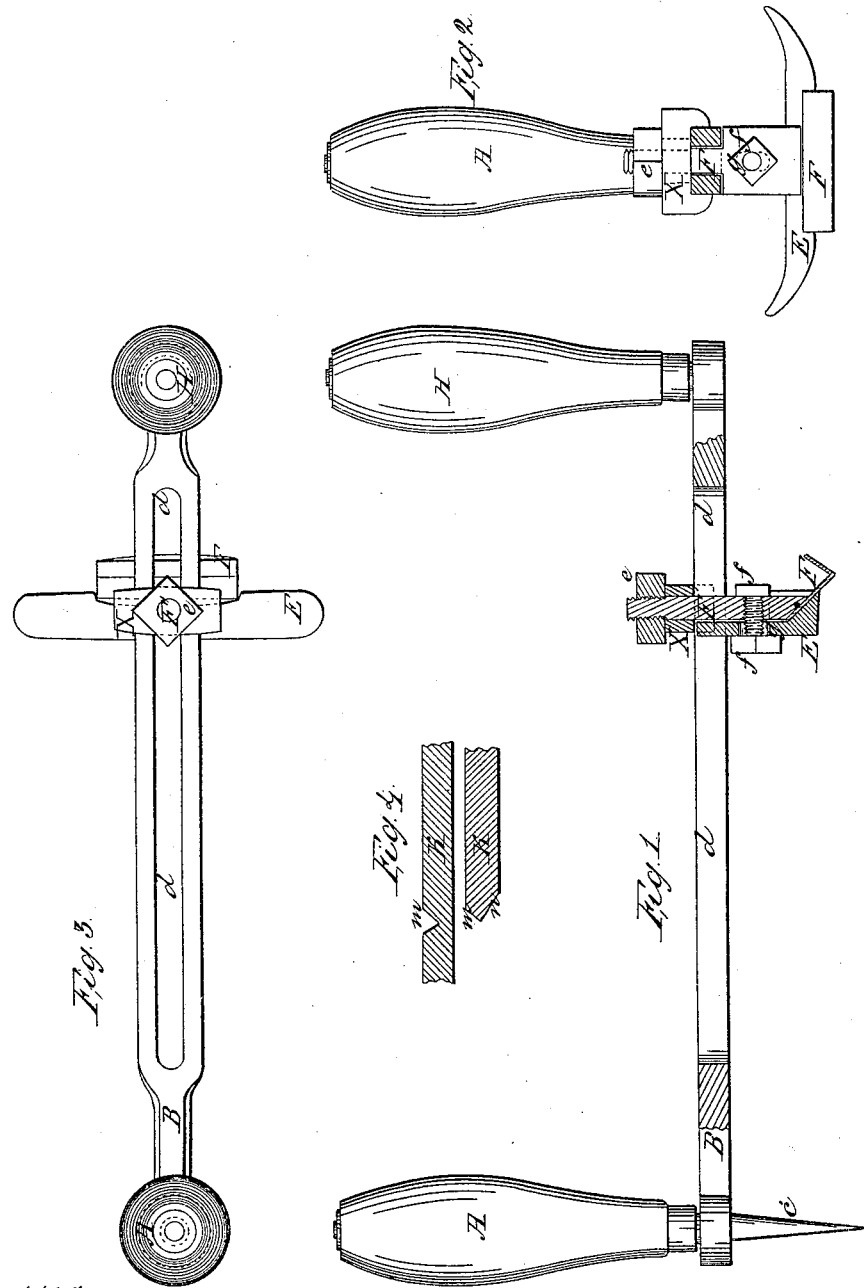
Witnesses
W. H. Forbush
E. B. Forbush
Inventor
Wm H. Bennett

UNITED STATES PATENT OFFICE.

WM. H. BENNETT, OF UTICA, NEW YORK.

IMPROVEMENT IN CUTTERS FOR BARREL-HEADS.

Specification forming part of Letters Patent No. 50,677, dated October 31, 1865.

*To all whom it may concern:*

Be it known that I, WILLIAM H. BENNETT, of the city of Utica, county of Oneida, and State of New York, have invented a new and Improved Tool for Cutting Barrel-Heads; and I do hereby declare that the following is a full and exact description of the same, reference being had to the accompanying drawings, making a part of this specification.

The nature of my invention consists in constructing an adjustable hand-tool for making barrel-heads, which pivots at the center of the head and takes a circular sweep from the center pivot and dresses the head to any required diameter and to any required bevel.

To enable others skilled in the art to make and use my invention, I will proceed to describe its construction and operation.

Having reference to the drawings, Figure I is a longitudinal sectional elevation; Fig. II, a transverse sectional elevation; Fig. III, a plan of the same. Fig. IV is a section of a barrel-head, showing the bevel-groove cut by the tool.

Letters of like name and kind refer to like parts in each of the figures.

B represents a supporting-bar, to which all other parts of the tool are attached. At the inner end of this bar is projected a pivot, as shown at C, for the purpose of being placed in the center of the barrel-head to form a central pivot to hold and guide the cutter in a circular sweep while the tool is doing its work.

F represents the cutter. It is made of a triangular shape at its cutting-edges, as represented, so as to give the required bevel to that part of the head which enters the crozing of the barrel-staves. This cutter has a shank, F', projecting upwardly, which passes through a long slot, d, in the bar B, and is made fast to the bar B by means of the nut e. The slot d enables the cutter to be moved outwardly or inwardly in order to be adjusted to any required diameter of head.

Shoulders are made in the shank of the cutter, which rest against the under side of the holding-bar, and a gib or guide, X, is placed upon the upper side of the holding-bar, through which the screw part of the shank passes, so that when the nut e is turned down tightly the cutter will be held firmly and securely in its place. There is also a slot made through the wider part of the cutter-shank, as shown at g. This is for the purpose of making an adjustable connection of the runner-shaped gage E to the cutter-shank. This gage is held to the cutter-shank by means of a bolt and nut, f. This gage may be set by means of the adjustable connection so as to give any required depth of cut.

A represents the pivot-handle, which is grasped by the left hand, and H the working-handle, which is grasped by the right hand, of the operator.

K represents a section of a barrel-head upon which the tool has done its work, and K' a section of a barrel-head as finished by a drawing-knife.

m represents the circular bevel groove which is cut by the tool on the face side of the head, and which determines the size or diameter of the head and gives the proper bevel to enter the crozing of the staves. When this groove is cut by the tool, as described, the pieces of which the head is made are then unfastened from the bench and the surplus ends of the pieces chipped off by a drawing-knife, forming the inside bevel, represented at n.

Operation: The piece or pieces of which the barrel-head is to be made is or are clamped to the work-bench in a common manner. The pivot C is then placed at the center, the cutter having been previously adjusted to dress the head of the required diameter. The operator then firmly holds the pivot C in its place by means of the handle A, and quickly moves the cutter in repeated circular sweeps by means of the handle H, and the cutter quickly and accurately cuts and forms the circular bevel groove represented at m, Fig. IV, which forms the proper bevel on the face side of the head to enter the croze. The pieces composing the head are then taken from their fastenings, and the under or inside bevel, n, is made by a drawing-knife, and the head is then ready to be put in its place in the barrel.

This tool is adapted to making heads for barrels, casks, and tubs of any given size.

Having thus described my improvement, what I claim, and desire to secure by Letters Patent, is—

An improved hand-tool for making barrel-heads, consisting of the working-bar B, central pivot C, adjustable cutter F, and gage E, the said parts being combined, and operating substantially as herein described.

W. H. BENNETT.

Witnesses:
CHAS. McCARTHY,
B. H. MUEHLE.